(12) United States Patent
Chen

(10) Patent No.: US 11,247,747 B1
(45) Date of Patent: Feb. 15, 2022

(54) PEDAL

(71) Applicant: Chun-Rong Chen, Taichung (TW)

(72) Inventor: Chun-Rong Chen, Taichung (TW)

( * ) Notice: Subject to any disclaimer, the term of this patent is extended or adjusted under 35 U.S.C. 154(b) by 0 days.

(21) Appl. No.: 17/160,591

(22) Filed: Jan. 28, 2021

(51) Int. Cl.
| | |
|---|---|
| *B62M 3/08* | (2006.01) |
| *F16B 21/06* | (2006.01) |
| *F16B 21/10* | (2006.01) |
| *F16B 21/16* | (2006.01) |
| *F16B 19/00* | (2006.01) |

(52) U.S. Cl.
CPC .............. *B62M 3/086* (2013.01); *B62M 3/08* (2013.01); *F16B 21/06* (2013.01); *F16B 21/10* (2013.01); *F16B 21/16* (2013.01); *F16B 2019/006* (2013.01)

(58) Field of Classification Search
CPC .......... B62M 3/08; B62M 3/086; F16B 21/06; F16B 21/10; F16B 21/16; F16B 2019/006
See application file for complete search history.

(56) References Cited

U.S. PATENT DOCUMENTS

| | | | | |
|---|---|---|---|---|
| 3,569,918 | A * | 3/1971 | Arnold | H01R 13/02 |
| | | | | 439/733.1 |
| 8,061,236 | B2 * | 11/2011 | French | B62M 3/08 |
| | | | | 74/594.4 |
| 8,141,456 | B2 * | 3/2012 | Chen | B62M 3/08 |
| | | | | 74/594.6 |
| 2009/0100961 | A1 * | 4/2009 | Hu | B62M 3/08 |
| | | | | 74/560 |
| 2014/0090516 | A1 * | 4/2014 | Liang | B62M 3/08 |
| | | | | 74/594.4 |

FOREIGN PATENT DOCUMENTS

CH    557670 A  *  1/1975  ............. A47K 10/40

* cited by examiner

*Primary Examiner* — Adam D Rogers

(74) *Attorney, Agent, or Firm* — Muncy, Geissler, Olds & Lowe, P.C.

(57) ABSTRACT

An anti-slip structure is provided, configured to be protrudingly disposed on a pedal. The anti-slip structure includes two connecting members connected with each other along an axial direction. One of the two connecting members includes an engaging concave portion, and the other of the two connecting members includes an engaging convex portion engaged with the engaging concave portion. A pedal including at least one of the anti-slip structure as described above is further provided, and the pedal further includes a pedal body. The pedal body has at least one through hole, and each said anti-slip structure is disposed through one of the at least one through hole.

10 Claims, 7 Drawing Sheets

PEDAL

BACKGROUND OF THE INVENTION

Field of the Invention

The present invention relates to an anti-slip structure and a pedal including the same.

Description of the Prior Art

A stepping surface of a pedal is usually a flat surface. When an user steps forward and downward on the stepping surface, the user's sole is easy to slip away from the stepping surface due to insufficient friction therebetween, which is inconvenient to apply force and easy to get hurt. Therefore, the stepping surface of part of conventional pedals has a plurality of anti-slip blocks or anti-slip screws disposed thereon to increase anti-slip effect.

However, to assemble the plurality of anti-slip screws, the pedal has to be drilled with a plurality of screw holes so as to allow the plurality of anti-slip screws to be screwed thereon, which is inconvenient to be manufactured and processed.

The present invention is, therefore, arisen to obviate or at least mitigate the above-mentioned disadvantages.

SUMMARY OF THE INVENTION

The main object of the present invention is to provide an anti-slip structure and a pedal including the same, and the anti-slip structure has a simple structure which is easy to manufacture and assemble.

To achieve the above and other objects, the present invention provides an anti-slip structure configured to be protrudingly disposed on a pedal. The anti-slip structure includes two connecting members connected with each other along an axial direction. One of the two connecting members includes an engaging concave portion, and the other of the two connecting members includes an engaging convex portion engaged with the engaging concave portion.

To achieve the above and other objects, the present invention further provides a pedal, including at least one of the anti-slip structure as described above, further including: a pedal body. The pedal body has at least one through hole, and each of the at least one anti-slip structure is disposed through one of the at least one through hole.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
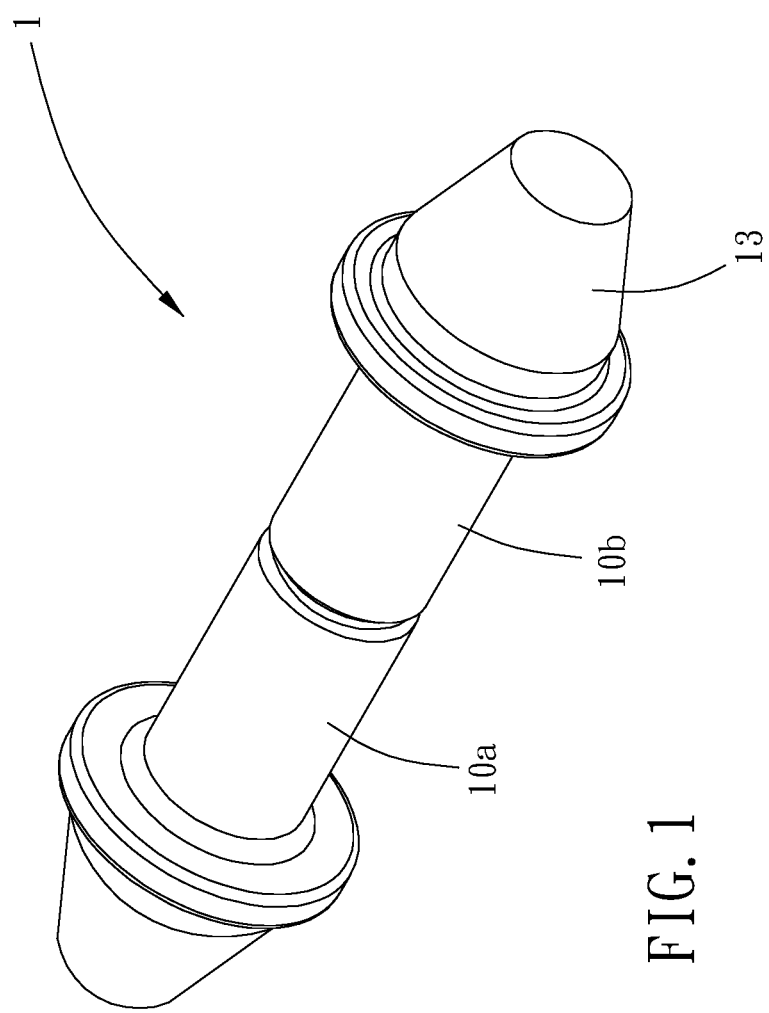
FIG. 1 is a stereogram of a first preferable embodiment of the present invention.
Figure 2:
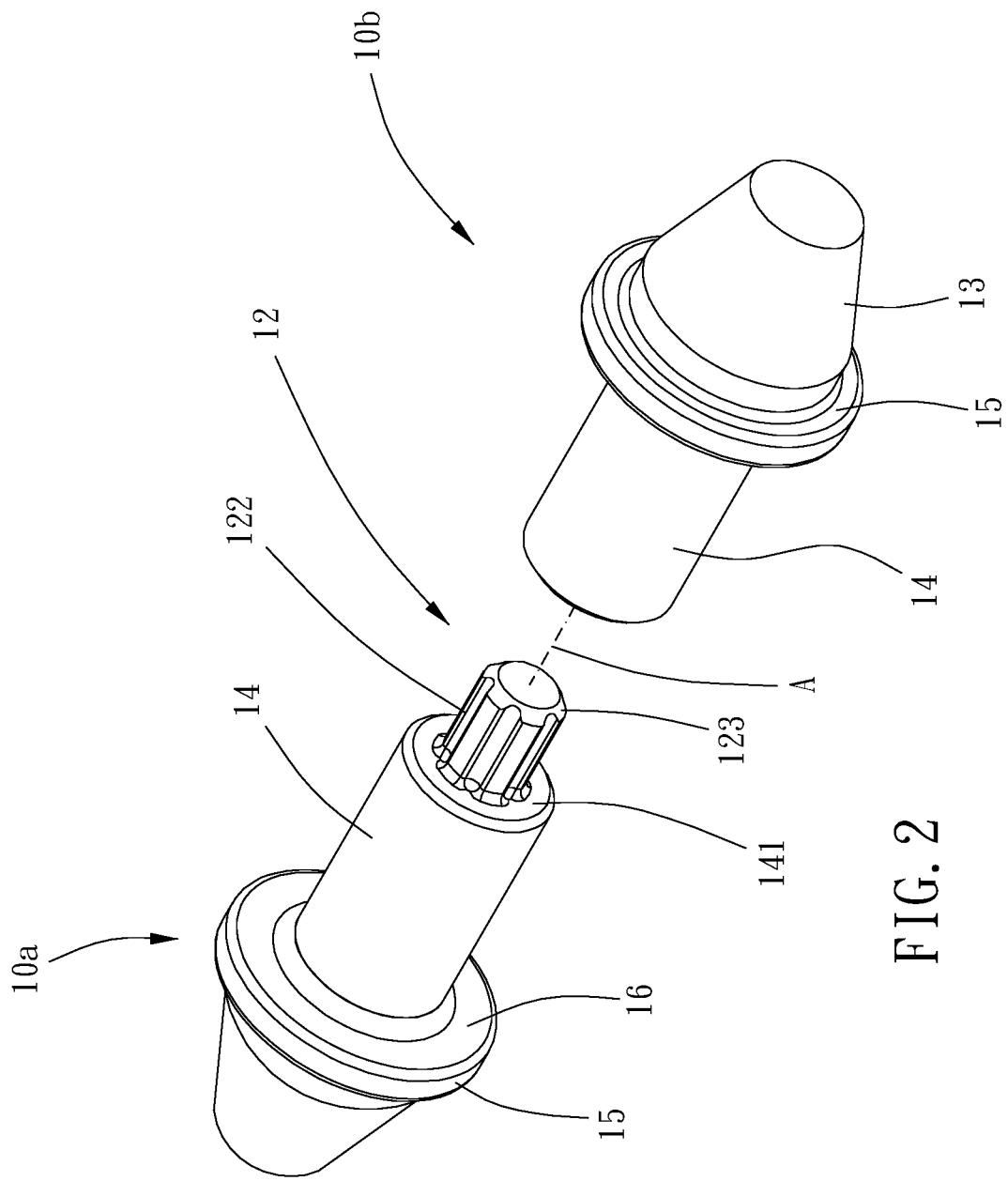
FIG. 2 is a breakdown drawing of the first preferable embodiment of the present invention.
Figure 3:
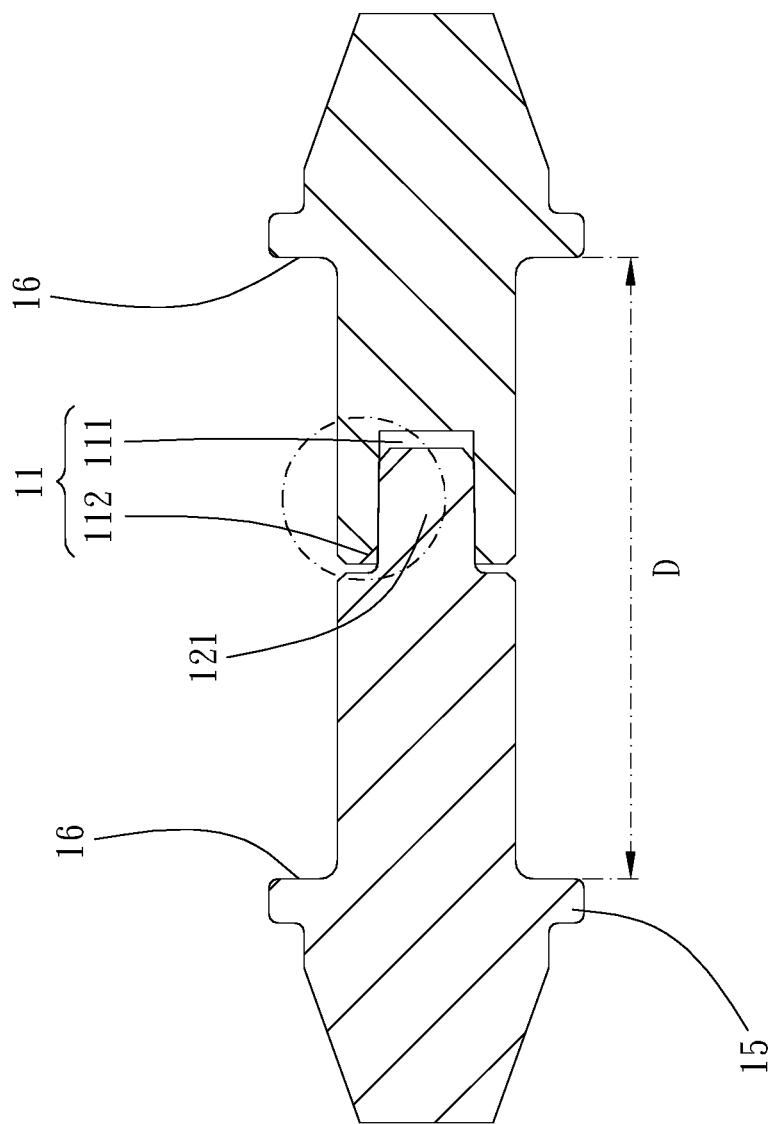
FIG. 3 is a cross-sectional view of the first preferable embodiment of the present invention.

Please refer to FIGS. 1 to 5 for a first preferable embodiment of the present invention. An anti-slip structure 1 of the present invention is configured to be protrudingly disposed on a pedal 2. The anti-slip structure 1 includes two connecting members 10a, 10b connected with each other along an axial direction A. One of the two connecting members 10b includes an engaging concave portion 11, and the other of the two connecting members 10a includes an engaging convex portion 12 engaged with the engaging concave portion 11, which is easy to manufacture and assemble.

Figure 4:
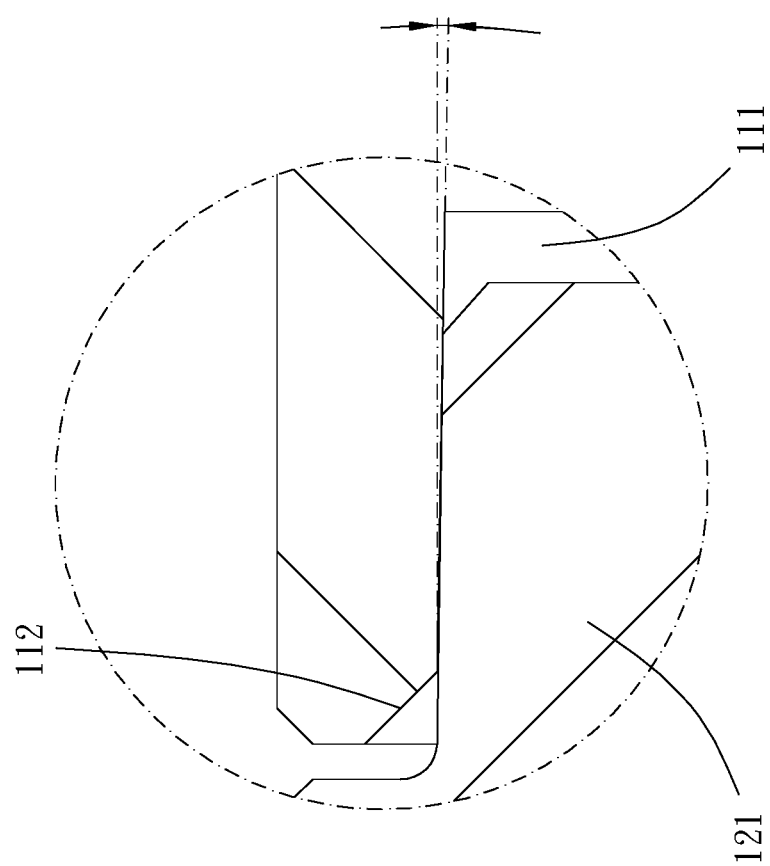
FIG. 4 is a partial enlargement of FIG. 3.

In this embodiment, the engaging concave portion 11 and the engaging convex portion 12 are connected with each other in tight-fit; specifically, the engaging concave portion 11 includes a recess 111 extending along the axial direction A, and the engaging convex portion 12 includes a protrusion 121 radially abutted against an inner peripheral wall of the recess 111, which allows quick assembling and provides stable connection. Preferably, an outer peripheral wall of the protrusion 121 has a plurality of grooves 122 axially extending thereon, and the plurality of grooves 122 are circumferentially spaced apart from one another, which allows the protrusion 121 to deform slightly during assembling. As shown in FIG. 4, a diametrical dimension of the recess 111 is gradually decreased in the axial direction A toward a side remote from the protrusion 121 so that the protrusion 121 is effectively urged to the inner peripheral wall of the recess 111 when the protrusion 121 is axially inserted within the recess 111. Therefore, the two connecting members 10a, 10b are stably connected with each other. Specifically, the protrusion 121 may be a cylinder, a rectangular column, a hexagonal column or the like, and a shape of the recess 111 corresponds to a shape of the protrusion 121; the two connecting members 10a, 10b may be made of plastic materials so as to be low cost and provide light weight. However, the two connecting members may be made of rubber materials so as to have good anti-slip effect; the two connecting members may be made of metal materials or composite materials so as to have good structural strength.

At least one of the two connecting members 10a, 10b further includes an anti-slip portion 13 and a connecting portion 14 which is connected between the anti-slip portion 13 and one of the engaging concave portion 11 and the engaging convex portion 12. In this embodiment, each of the two connecting members 10a, 10b has one said anti-slip portion 13 and one said the connecting portion 14; for each of the two connecting members 10a, 10b, a maximum diametrical dimension of the anti-slip portion 13 is larger than a diametrical dimension of the connecting portion 14 so as to be configured to be abuttable against the pedal 2 and provide restriction effect. The protrusion 121 extends from an end surface 141 of the connecting portion 14 of one of the two connecting members 10a, and a diametrical dimension of the protrusion 121 is smaller than the diametrical dimension of the connecting portion 14 from which the protrusion 121 extends. In assembling, the connecting portion 14 of the other of the two connecting members 10b is abutted against the end surface 141; the protrusion 121 and the inner peripheral wall of the recess 111 respectively have an inclined guiding surface 112, 123 inclined relative to the axial direction A, which provides guiding effect for easy assembling. Each of the two connecting members 10a, 10b further includes a flange 15 radially extending outwardly so as to stably restrict the two connecting members 10a, 10b to protrude beyond a surface of the pedal 2. Preferably, the flange 15 of each of the two connecting members 10a, 10b is located between one said connecting portion 14 and one said anti-slip portion 13; a diametrical dimension of the flange 15 of each of the two connecting members 10a, 10b is larger than the diametrical dimension of one said connecting portion 14 and larger than or equal to a diametrical dimension of one said anti-slip portion 13, which has a simple structure and is stably assembled. The two connecting members 10a, 10b further include two abutting surfaces 16 configured to be abuttable against the pedal 2, and the two abutting surfaces 16 are spaced apart and face each other. In the axial direction A, a distance D between the two abutting surfaces 16 is between 4 mm to 30 mm, which is changeable according to a thickness of an assembling position of the pedal 2. In this embodiment, each of the two abutting surfaces 16 is disposed on one said flange 15; the anti-slip portion 13 of at least one of the two connecting members 10a, 10b is tapered in the axial direction A toward one end remote from one said connecting portion 14 so as to increase a contact area with a sole of an user for anti-slip effect. In other embodiments, the two connecting members may only have one said anti-slip portion; each of the two abutting surfaces may be disposed on a side, face one said connecting portion, of the anti-slip portion of one of the two connecting members without the flange.

Figure 5:
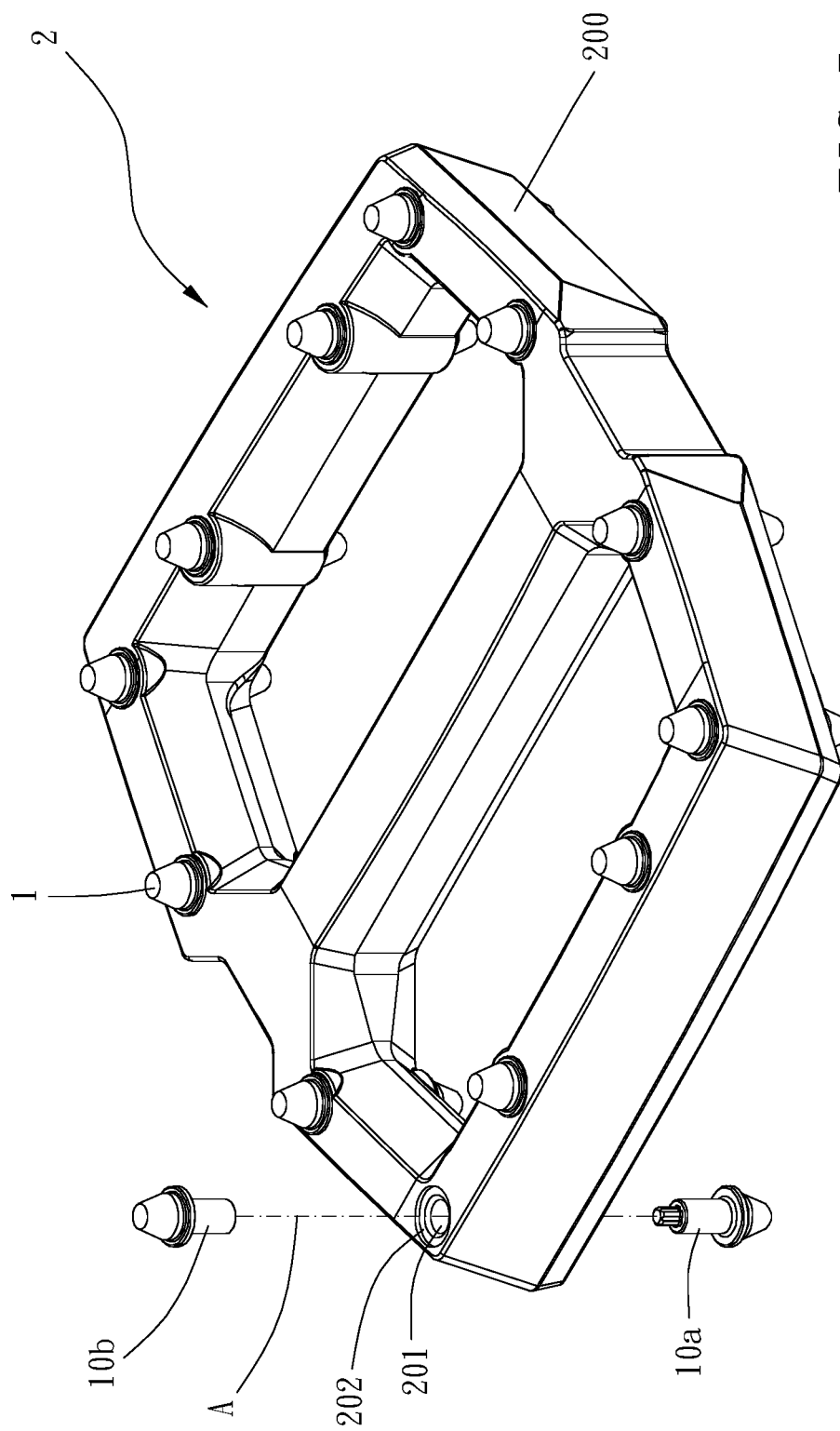
FIG. 5 is a schematic diagram showing assembling according to the first preferable embodiment of the present invention.

Refer to FIG. 5, the present invention further provides a pedal 2. The pedal 2 includes at least one of the anti-slip structure 1 as described above, and the pedal 2 further includes a pedal body 200. The pedal body 200 has at least one through hole 201, and each said anti-slip structure 1 is disposed through one of the at least one through hole 201. In assembling, the two connecting members 10a, 10b are respectively inserted from two opposite ends of the through hole 201 and connected with each other, which provides quick and conveniences assembling. Moreover, said anti-slip portions 13 of the two connecting members 10a, 10b respectively protrude beyond two opposite surfaces of the pedal body 200 so that two stepping surfaces of the pedal body 200 have preferable anti-slip effect. Preferably, the pedal body 200 further has at least one stepped portion 202 disposed around one of the at least one through hole 201, and at least one of the two connecting members 10a, 10b is axially abuttable against the at least one stepped portion 202 so as to have good positioning effect. In the axial direction A, the two connecting members 10a, 10b of each said anti-slip structure 1 are respectively abutted against the two opposite surfaces of the pedal body 200 so as to be stably assembled and avoid displacement. However, the pedal body may be without the at least one stepped portion.

Figure 6:
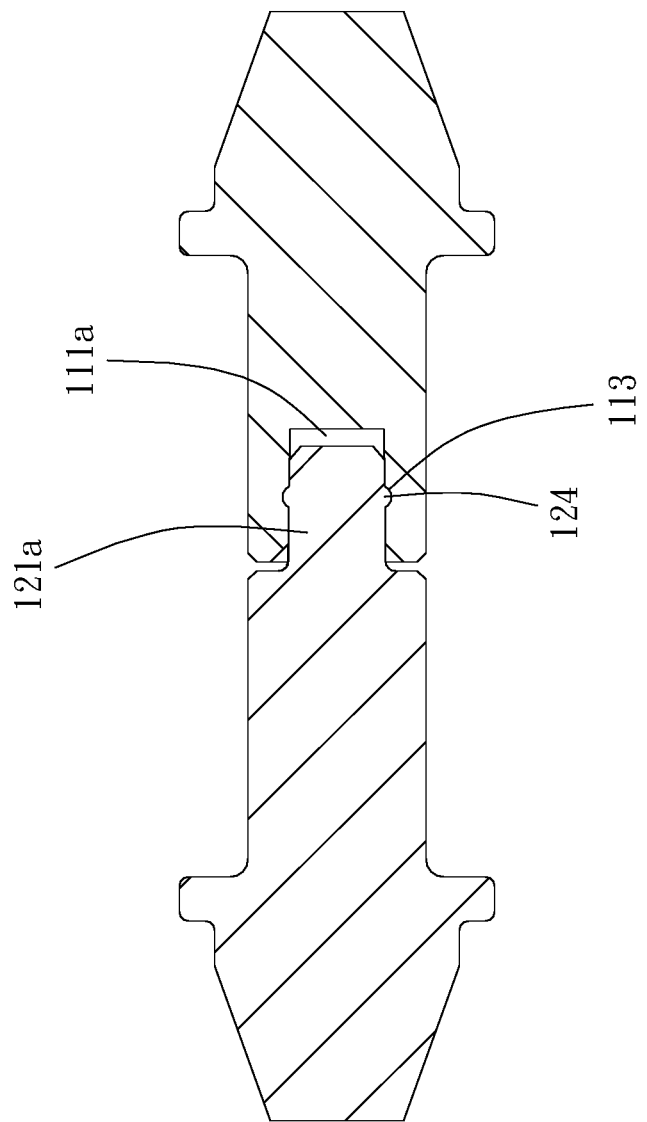
FIG. 6 is a cross-sectional view of a second preferable embodiment of the present invention.
Figure 7:
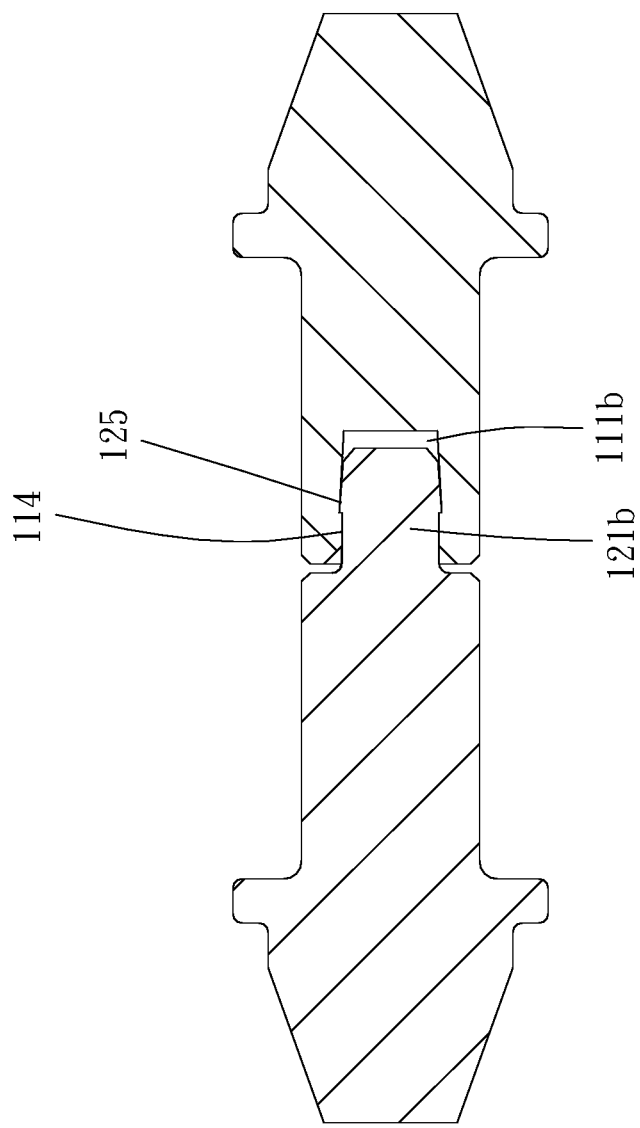
FIG. 7 is a cross-sectional view of a third preferable embodiment of the present invention.

Please refer to FIG. 6 showing a second preferable embodiment of the present invention. Compared to the first preferred embodiment, one of the outer peripheral wall of the protrusion 121a and the inner peripheral wall of the recess 111a further has at least one restricting projection 124, and the other of the outer peripheral wall of the protrusion 121a and the inner peripheral wall of the recess 111a further has at least one restricting recession 113 corresponding to the at least one restricting projection 124 so that the engaging concave portion 11 is interferable with the engaging convex portion 12 in the axial direction A for stable assembling. The at least one restricting projection 124 may include a plurality of blocks circumferentially spaced apart from one another for easy insertion and stable radial restriction. In other embodiments, the outer peripheral wall of the protrusion 121b and the inner peripheral wall of the recess 111b may respectively include at least one stepped projection 114, 125 so as to be axially blocked with each other, as shown in FIG. 7.

In summary, the two connecting members of each said anti-slip structure are inserted within one of the at least one through hole and connected with each other along the axial direction. Without any screwing structure, the anti-slip structure is easy to manufacture and quickly assemble, and the engaging concave portion and the engaging convex portion are stably engaged and have good structural strength.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pedal, including:
   a pedal body, having at least one through hole; and
   at least one anti-slip structure, including two connecting members connected with each other along an axial direction, one of the two connecting members including an engaging concave portion, the other of the two connecting members including an engaging convex portion engaged with the engaging concave portion, each said anti-slip structure disposed through one of the at least one through hole.

2. The pedal of claim 1, wherein the pedal body further has at least one stepped portion disposed around one of the at least one through hole, and at least one of the two connecting members is axially abuttable against the at least one stepped portion.

3. The pedal of claim 1, wherein in the axial direction, the two connecting members of each said anti-slip structure are respectively abutted against two opposite surfaces of the pedal body.

4. The pedal of claim 1, wherein at least one of the two connecting members further includes an anti-slip portion and a connecting portion which is connected between the anti-slip portion and one of the engaging concave portion and the engaging convex portion.

5. The pedal of claim 1, wherein each of the two connecting members further includes a flange radially extending outwardly.

6. The pedal of claim 1, wherein the two connecting members further include two abutting surfaces configured to be abuttable against the pedal, the two abutting surfaces are spaced apart and face each other, and in the axial direction, a distance between the two abutting surfaces is between 4 mm to 30 mm.

7. The pedal of claim 1, wherein the engaging concave portion includes a recess extending along the axial direction, and the engaging convex portion includes a protrusion radially abutted against an inner peripheral wall of the recess.

8. The pedal of claim 7, wherein a diametrical dimension of the recess is decreased in the axial direction toward a side remote from the protrusion.

9. The pedal of claim 7, wherein an outer peripheral wall of the protrusion has a plurality of grooves axially extending thereon, and the plurality of grooves are circumferentially spaced apart from one another.

10. The pedal of claim 9, wherein each of the two connecting members further includes an anti-slip portion and a connecting portion which is connected between the anti-slip portion and one of the engaging concave portion and the engaging convex portion; for each of the two connecting members, a maximum diametrical dimension of the anti-slip portion is larger than a diametrical dimension of the connecting portion; each of the two connecting members further includes a flange radially extending outwardly and located between the connecting portion and the anti-slip portion; a diametrical dimension of the flange of each of the two connecting members is larger than the diametrical dimension of the connecting portion and larger than or equal to a diametrical dimension of the anti-slip portion; the two connecting members further includes two abutting surfaces configured to be abuttable against the pedal, the two abutting surfaces are spaced apart and face each other, and in the axial direction, a distance between the two abutting surfaces is between 4 mm to 30 mm; each of the two abutting surfaces is disposed on one said flange; the protrusion extends axially from an end surface of the connecting portion of one of the two connecting members, and a diametrical dimension of the protrusion is smaller than the diametrical dimension of the connecting portion from which the protrusion extends; a diametrical dimension of the recess is decreased in the axial direction toward a side remote from the protrusion; the protrusion and the inner peripheral wall of the recess respectively have an inclined guiding surface inclined relative to the axial direction; the anti-slip portion of at least one of the two connecting members is tapered in the axial direction toward one end remote from one said connecting portion.

\* \* \* \* \*